United States Patent
Youcef-Toumi et al.

(10) Patent No.: US 9,397,587 B2
(45) Date of Patent: Jul. 19, 2016

(54) MULTI-ACTUATOR DESIGN AND CONTROL FOR A HIGH-SPEED/LARGE-RANGE NANOPOSITIONING SYSTEM

(71) Applicant: Massachusetts Institute of Technology, Cambridge, MA (US)

(72) Inventors: Kamal Youcef-Toumi, Cambridge, MA (US); Iman Soltani Bozchalooi, Cambridge, MA (US); Andrew Careaga Houck, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/547,480

(22) Filed: Nov. 19, 2014

(65) Prior Publication Data

US 2015/0137712 A1 May 21, 2015

Related U.S. Application Data

(60) Provisional application No. 61/906,547, filed on Nov. 20, 2013.

(51) Int. Cl.
*H01L 39/00* (2006.01)
*H02N 2/06* (2006.01)
*H02N 2/04* (2006.01)
*G01Q 10/04* (2010.01)
(Continued)

(52) U.S. Cl.
CPC ............... *H02N 2/06* (2013.01); *G01Q 10/04* (2013.01); *G01Q 10/06* (2013.01); *G01Q 30/04* (2013.01); *H02N 2/04* (2013.01)

(58) Field of Classification Search
CPC ............. H02N 2/06; H02N 2/04; H02N 2/00; G01Q 10/04; G01Q 30/04; G01Q 10/062
USPC ......... 318/38, 611, 569, 575, 567, 39, 568.22, 318/118; 310/309; 324/756.01; 850/1–6, 21
See application file for complete search history.

(56) References Cited

U.S. PATENT DOCUMENTS

| | | | | |
|---|---|---|---|---|
| 5,467,642 A | * | 11/1995 | Hosaka | B82Y 35/00 73/105 |
| 5,751,585 A | * | 5/1998 | Cutler | B23K 26/083 318/571 |
| 6,430,465 B2 | * | 8/2002 | Cutler | B23K 26/04 318/568.17 |

(Continued)

OTHER PUBLICATIONS

Bozchalooi et al. "Compensator design for improved counterbalansing in high speed atomic force microscopy" Nov. 2011.*

(Continued)

*Primary Examiner* — Rita Leykin
(74) *Attorney, Agent, or Firm* — Sam Pasternack; MIT Technology Licensing Office

(57) ABSTRACT

Multi-actuator system. The system includes at least two nano positioners having different ranges and bandwidths located in cascaded serial form to contact and move an object. A control system employs data-based control design to combine the at least two nano positioners so as to apportion actuation responsibilities among the at least two nano positioners so as to compensate for their coupled dynamics while moving the object. It is preferred to provide a separate controller for controlling separately each of the at least two nano positioners. Parameters of the separate controllers may be determined by minimizing output error.

13 Claims, 8 Drawing Sheets

(51) Int. Cl.
G01Q 10/06 (2010.01)
G01Q 30/04 (2010.01)

(56) References Cited

U.S. PATENT DOCUMENTS

| | | | | |
|---|---|---|---|---|
| 6,881,954 | B1* | 4/2005 | Morimoto | B82Y 35/00 250/307 |
| 7,093,827 | B2* | 8/2006 | Culpepper | F16C 11/12 267/160 |
| 7,239,107 | B1* | 7/2007 | Ferreira | H02N 1/006 318/569 |
| 7,304,486 | B2* | 12/2007 | Petersen | G01R 1/073 324/750.16 |
| 7,307,370 | B2* | 12/2007 | Pan | B82Y 35/00 310/328 |
| 7,557,470 | B2* | 7/2009 | Culpepper | B81B 3/0062 310/15 |
| 7,647,848 | B2* | 1/2010 | Layton | B82Y 35/00 73/865.8 |
| 7,928,409 | B2* | 4/2011 | Perkins | B82Y 35/00 250/491.1 |
| 8,045,444 | B2* | 10/2011 | Sebastian | B82Y 10/00 369/126 |
| 8,310,128 | B2* | 11/2012 | Ferreira | H02N 1/008 310/309 |
| 8,312,561 | B2* | 11/2012 | Rangelow | B82Y 35/00 850/1 |
| 8,746,310 | B2* | 6/2014 | Wason | B81C 1/00063 156/356 |
| 8,766,177 | B2* | 7/2014 | Verbeck, IV | H01J 49/0459 250/282 |
| 8,829,431 | B2* | 9/2014 | Verbeck, IV | H01J 49/0459 250/288 |
| 8,834,146 | B2* | 9/2014 | Saha | C03C 19/00 425/150 |
| 8,879,147 | B2* | 11/2014 | Schonbrun | G02B 5/1885 359/385 |
| 8,904,560 | B2* | 12/2014 | Shi | B82Y 35/00 850/11 |
| 8,997,260 | B2* | 3/2015 | Murdick | G01Q 30/025 850/21 |
| 9,021,881 | B2* | 5/2015 | Jun | G01N 29/14 33/503 |
| 9,190,600 | B2* | 11/2015 | Clark | H01L 41/0973 |
| 2011/0193510 | A1* | 8/2011 | Fleming | B82Y 35/00 318/611 |

OTHER PUBLICATIONS

Vicary et al., Real-time nanofabrication with high-speed atomic force microscopy, Nanotechnology, 2009, 1-5, 20, IOP Publishing, UK.

Picco et al., High-speed afm of human chromosomes in liquid, Nanotechnology, 2008, 1-6, 19, IOP Publishing, UK.

Braunsmann, High-speed force mapping on living cells with a small cantilever atomic force microscope, Review of Scientific Instruments, 2014, 85, AIP Publishing, US.

Ando, High-speed atomic force microscopy coming of age, Nanotechnology, 2012, 1-27, 23, AIP Publishing, US.

Yong et al., High-speed cycloid-scan atomic force microscopy, Nanotechnology, 2010, 1-4, 21, AIP Publishing, US.

Picco et al., Breaking the speed limit with atomic force microscopy, Nanotechnology, 2007, 1-4, 18, AIP Publishing, US.

Carberry et al., Mapping real-time images of high-speed afm using multitouch control, Nanotechnology, 2009, 1-5, 20, AIP Publishing, US.

Tien et al., A review of feedforward control approaches in nanopositioning for high-speed spm, Journal of Dynamic Systems, Measurement, and Control, 2009, 131, ASME, US.

Wu et al., A control approach to cross-coupling compensation of piezotube scanners in tapping-mode atomic force microscope imaging, Review of Scientific Instruments, 2009, 80, American Institute of Physics, US.

Braunsmann et al., Optical knife-edge displacement sensor for high-speed atomic force microscopy, Applied Physics Letters, 2014, 104, AIP Publishing LLC, US.

Yamamoto et al., Anisotropic diffusion of point defects in a two dimensional crystal of streptavidin observed by high-speed atomic force microscopy, Nanotechnology, 2008, 1-9, 19, IOP Publishing, UK.

Fleming, A megahertz bandwidth dual ampli_er for driving piezoelectric actuators and other highly capacitive loads, Review of Scientific Instruments, 2009, 80, American Institute of Physics, US.

Fukuma et al., Development of low noise cantilever deection sensor for multienvironment frequency-modulation atomic force microscopy, Review of Scientific Instruments, 2005, 76, American Institute of Physics, US.

Yong et al., Invited review article: High-speed exureguided nanopositioning: Mechanical design and control issues, Review of Scientific Instruments, 2012, 83, American Institute of Physics, US.

Schitter et al., Design and modeling of a high-speed afm-scanner, Control Systems Technology, IEEE Transactions on 15 (5) (2007), Proceedings of the 2008 American Control Conference Minneapolis, Minnesota, USA.

Bozchalooi et al., Compensator design for improved counterbalancing in high speed atomic force microscopy, Review of Scientific Instruments, 2011, 82, American Institute of Physics, US.

Fleming, Dual-stage vertical feedback for high-speed scanning probe microscopy, IEEE Transactions on Control Systems Technology, 2011, 19, IEEE, US.

Wu et al., Robust inversion-based 2-dof control design for output tracking: Piezoelectric-actuator example, Control Systems Technology, IEEE Transactions, 2009, 1069-1082, 17, IEEE, US.

Leang et al., Feedforward control of piezoactuators in atomic force microscope systems, Control Systems, 2009, 70-82, 29, IEEE, US.

Braunsmann et al., High-speed atomic force microscopy for large scan sizes using small cantilevers, Nanotechnology, 2010, 1-7, 21, AIP Publishing, US.

Schitter et al., A new control strategy for high-speed atomic force microscopy, Nanotechnology, 2004, 15, IOP, UK.

Ando et al., A high-speed atomic force microscope for studying biological macromolecules in action, Chemphyschem, 2003, 1196-1202, Wiley-VCH Verlag GmbH& Co. KGaA, Weinheim, Germany.

Schaffer and Hansma, Characterization and optimization of the detection sensitivity of an atomic force microscope for small cantilevers, Journal of Applied Physics, 1998, 4661-4666, 84, American Institute of Physics, US.

Aifantis et al., Capturing the elasticity and morphology of live fibroblast cell cultures during degradation with atomic force microscopy, Journal of Microscopy, 2013, 62-68, 249, Journal of Microscopy, 2012 Royal Microscopical Society, UK.

Schitter et al., Dual actuation for high-bandwidth nanopositioning, 2006, vols. 1-9, 1782-1787, 47th Ieee Conference on Decision and Control, US.

Fleming, High-speed vertical positioning for contact-mode atomic force microscopy, 2009, 522-527, vols. 1-3, Ieee/asme International Conference on Advanced Intelligent Mechatronics, US.

Kuiper et al., Dual actuation for high speed atomic force microscopy, 2010, 220-226, 5th IFAC Symposium on Mechatronic Systems, IFAC, US.

Sulchek et al., Dual integrated actuators for extended range high speed atomic force microscopy, Applied Physics Letters, 1999, 1637-1639, 75, American Institute of Physics, US.

Jeong et al., Control of tip-to-sample distance in atomic force microscopy: A dual-actuator tip-motion control scheme, Review of Scientific Instruments, 2007, 78, American Institute of Physics, US.

Mamin et al., High-speed scanning-tunneling-microscopy—principles and applications, Journal of Applied Physics, 1994, 161-168, 75, American Institute of Physics, US.

Fleming et al., Ultra-fast dual-stage vertical positioning for high performance SPMs, 2010 American Control Conference, 2010, 4975-4980, AACC, US.

Yan et al., An integrated approach to piezoactuator positioning in high-speed atomic force microscope imaging, Review of Scientific Instruments, 2008, 79, American Institute of Physics, US.

(56) References Cited

OTHER PUBLICATIONS

Kuiper and Schitter, Model-based feedback controller design for dual actuated atomic force microscopy, Mechatronics, 2012, 327-337, 22, Elsevier Science B.V., Netherlands.

Akagi et al., Servo signal quality and dual-stage actuator system for micro trackwidth, Journal of Magnetism and Magnetic Materials, 1994, 134, 242-247, Elsevier Science B.V., Netherlands.

Ljung, System identification: Theory for the user, 1999, 2nd Edition, Prentice Hall, UpperSaddle River, NJ, 1999.

Bozchalooi et al., Multi-actuation and PI control: A simple recipe for high-speed and large-range atomic force microscopy, Ultramicroscopy, 2014, 146, 117-124, Elsevier Science, B.V., Netherlands.

Liang and Baer, Anistropic dissolution at the CaCO3 water interface, Surface Science, 1997, 275-278, Elsevier Science B.V., Netherlands.

Shiraki et al., Dissolution kinetics of calcite in 0.1 M NaCl solution at room temperature: An atomic force microscopic (AFM) study, Aquatic Geochemistry, 2000, 87-108, Kluwer Academic Publishers, Netherlands.

De Giudici, Surface control vs. diffusion control during calcite dissolution: Dependence of step-edge velocity upon solution pH, American Mineralogist, 2002, 87, 1279-1285, American Mineralogist, US.

Notification of Transmittal of The International Search Report and the Written Opinion of the International Searching Authority for PCT/US2014/066586 mailed on Mar. 9, 2015.

\* cited by examiner

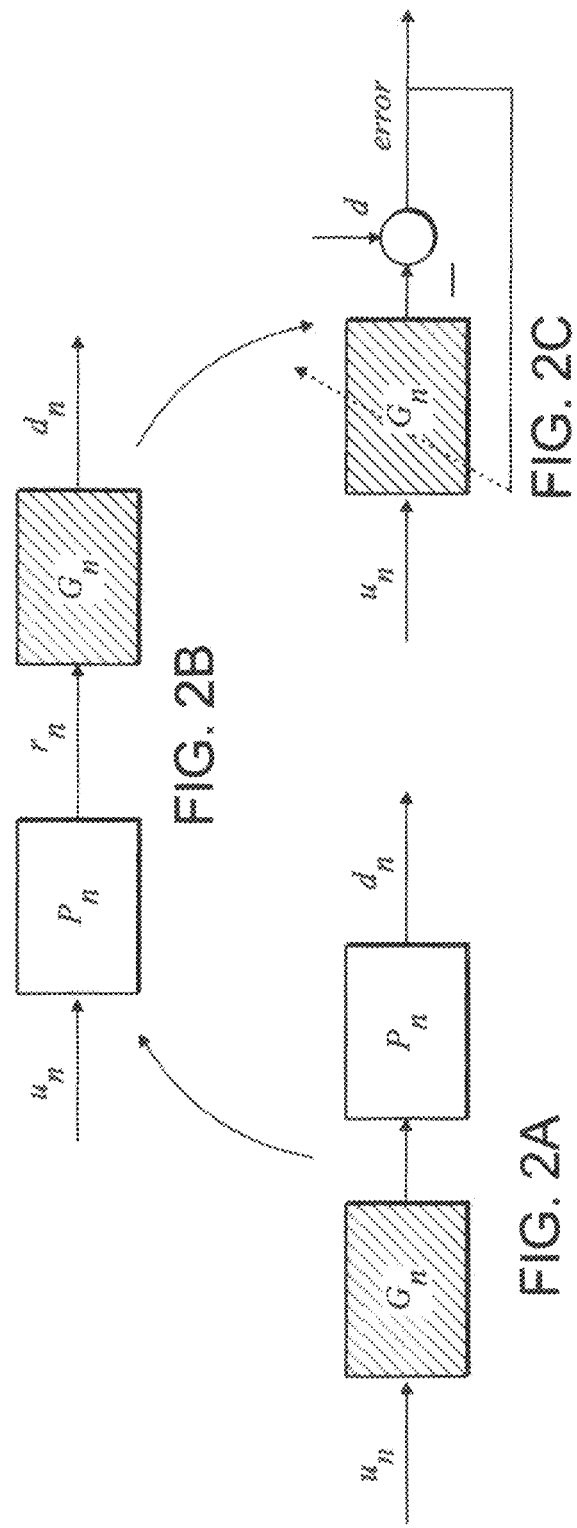

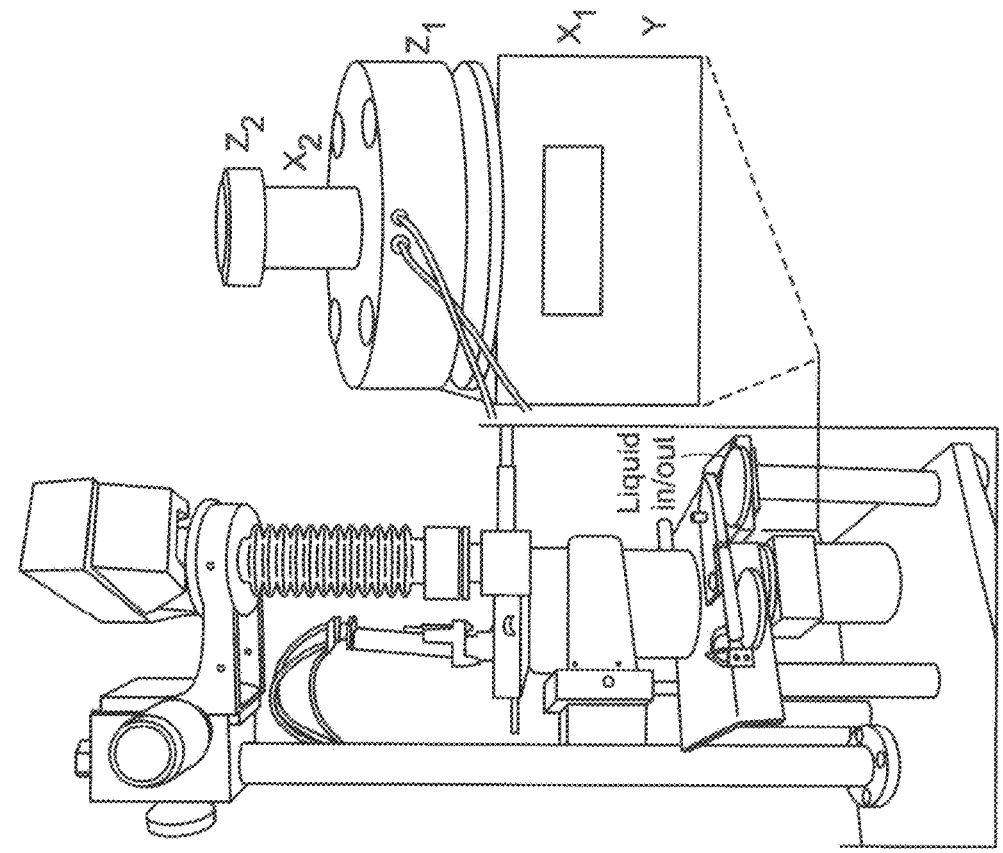
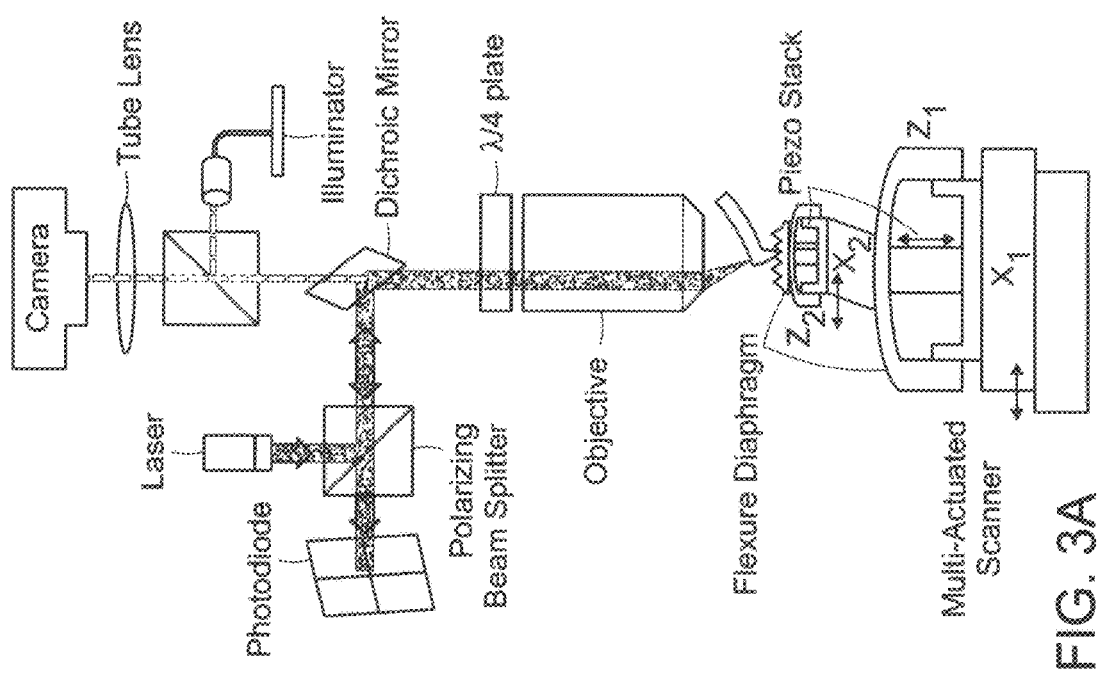
FIG. 3A
FIG. 3B

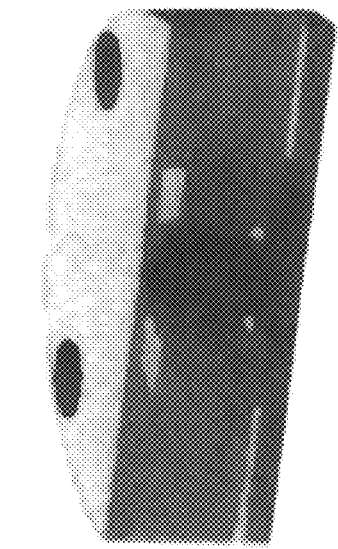
FIG. 4C
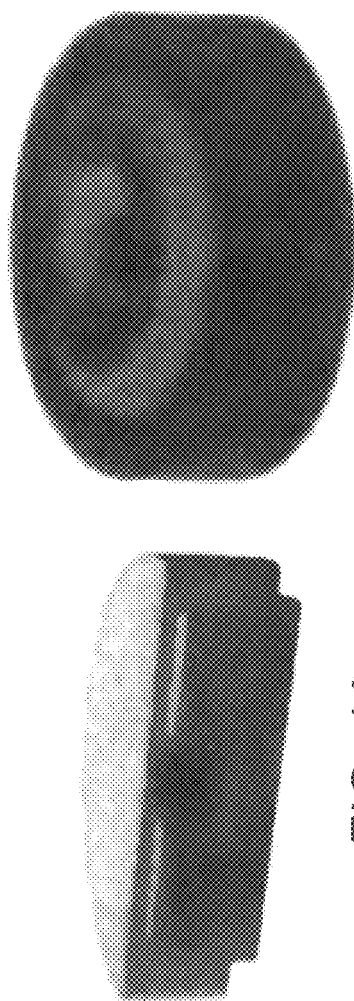
FIG. 4B
FIG. 4A
FIG. 4E
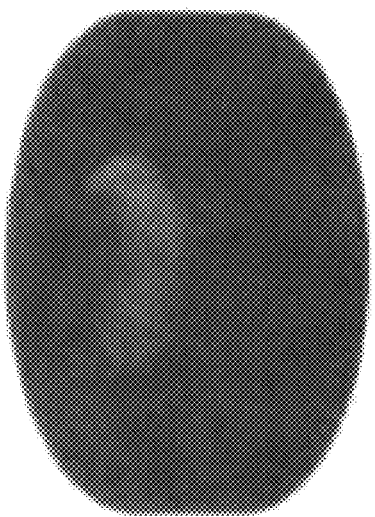
FIG. 4D

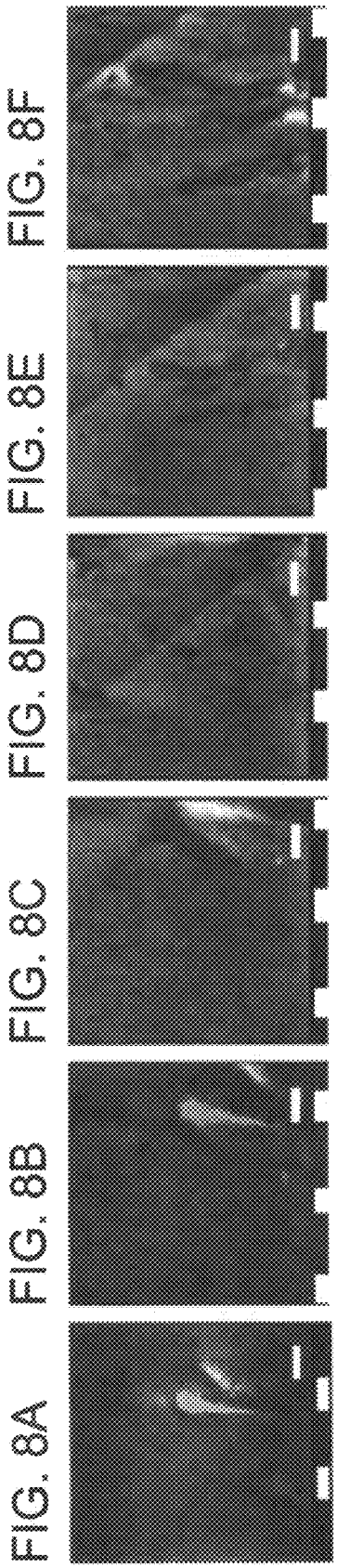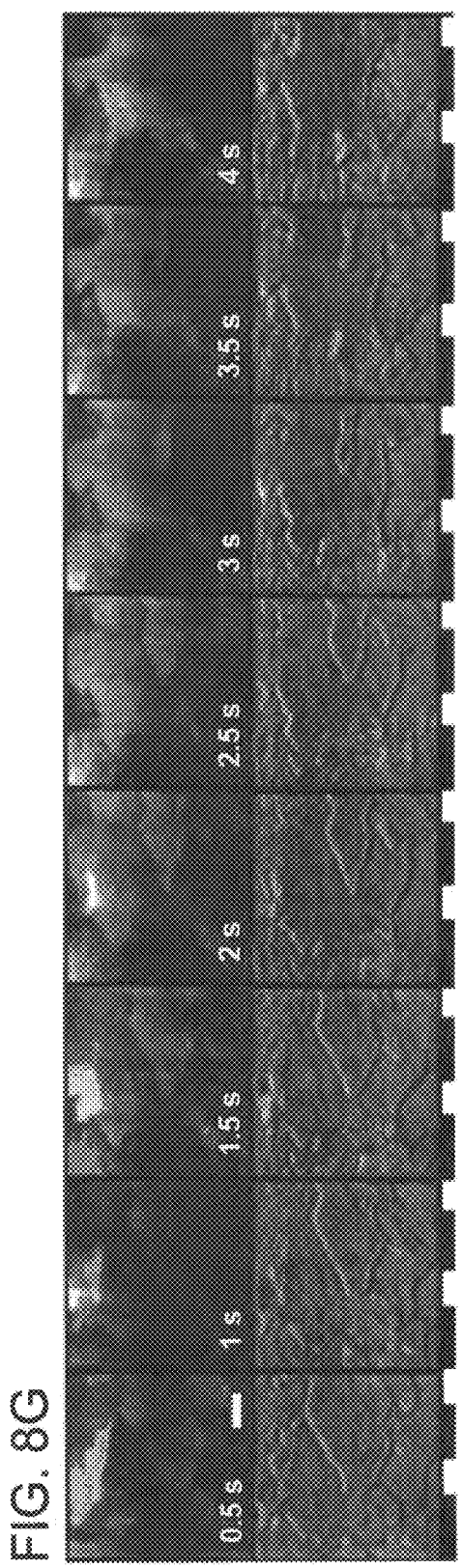

US 9,397,587 B2

MULTI-ACTUATOR DESIGN AND CONTROL FOR A HIGH-SPEED/LARGE-RANGE NANOPOSITIONING SYSTEM

This patent application claims priority to provisional application Ser. No. 61/906,547 filed on Nov. 20, 2013, the contents of which are incorporated herein by reference.

BACKGROUND OF THE INVENTION

This invention relates to nanopositioning such as for an atomic force microscope, and more particularly to such a nanopositioning system using series-connected actuators that simultaneously achieve high speed performance as well as large out-of-plane and lateral scan ranges.

High speed imaging capability expands the applications of atomic force microscopy (AFM) to the study of dynamic nano-scale processes. This advantage and the associated research potentials [1, 2, 3] have been the motivation behind a considerable amount of research efforts on high-speed atomic force microscopy during the past decade [4, 5, 6, 7, 8, 9, 10]. These efforts have brought about significant improvements in the state of the art and have unlocked novel scientific observations [11]. To enable high-speed AFM imaging, electrical [12], optical [13], mechanical [14, 15] and control [16, 17, 18, 19] components of the AFM have been improved.

Research on the design of AFM scanners [20] has led to rigid designs capable of high scan speeds. Optimal feedforward and feedback control techniques are used to reduce the tip-sample interaction forces at high speeds [21]. Active vibration suppression techniques have been applied to tackle the out-of-plane scanner dynamics and extend the closed loop bandwidth of the AFM [16]. The size of AFM micro-cantilevers has been reduced significantly, increasing the probe resonance frequency to a few megahertz while maintaining small spring constant for minimal tip-sample interaction forces [22]. Furthermore, to enable application of these small probes, the optical beam deflection setup has been modified to achieve a smaller focused laser 15 spot size [13, 23].

Increasing the bandwidth performance of the AFM scanner while maintaining a reasonable scan range is currently the most challenging aspect of high-speed atomic force microscopy. This limitation is rather fundamental. Wider mechanical bandwidth requires increased rigidity and reduced translated mass, and leads naturally to decreased lateral and out-of-plane scan range [15, 22]. This has limiting practical implications. Small out-of-plane range limits the application of AFM as the topography height variations due to sample tilt [17] or thickness e.g. cells [24] may necessitate several microns of travel. Limited lateral range is likewise problematic as sample features of interest can span a large area in many imaging applications. To simultaneously achieve both the range and speed requirements of the out-of-plane AFM actuator, researchers have applied dual actuation methodologies [17, 25, 26, 27, 28, 29, 30, 31, 32, 33]. In this approach, emanating from hard disk drive (HDD) research [34], two out-of-plane nano-positioners are combined where one is fast and short-range and the other slow and large-range. These earlier works on multi-actuation, all limited to out-of-plane motion of the scanner, can be divided into two main categories. In one, self-actuated AFM probes are used in combination with external piezos [28,29]. This approach suffers from either the bandwidth or range limitations of bimorph actuators [28] or the complexity of attachment and actuation of magnetic nanoparticles [29]. In the second category [25, 26, 27, 30], two external piezo actuators are used on independent substrates where one moves the sample and the other moves the probe. This arrangement avoids dynamic coupling, but limits the technique to only two actuators and requires modifications in the optical path of sample-scan AFMs.

An object of the present invention is a new multi-actuated atomic force microscope which features a number of practical advantages. The concept of multi-actuation is extended to all scan directions, enabling large-range and high speed performance for both lateral and out-of-plane actuators. The method is presented in a generalized form applicable to any number of actuators.

SUMMARY OF THE INVENTION

The multi-actuator system according to the invention for nano positioning control includes at least two nano positioners having different ranges and bandwidths located in cascaded serial form to contact and move an object. A control system employing data-based control design combines the at least two nano positioners so as to apportion actuation responsibilities among the at least two nano positioners so as to compensate for their coupled dynamics while moving the object. In a preferred embodiment, a separate controller is provided for separately controlling each of the at least two nano positioners. It is preferred that the parameters of the separate controllers be determined by minimizing an output error.

In a preferred embodiment, the at least two nano positioners each contain a piezoelectric stack. In a particularly preferred embodiment, the at least two nano positioners position object in an atomic force microscope scanner.

The multi-actuated scanner disclosed herein behaves as that of a single actuator with large range and high speed. In addition, the design of the scanner disclosed herein ensures decoupled performance along the X, Y and Z axes.

BRIEF DESCRIPTION OF THE DRAWING

FIG. 2a is a schematic illustration of a cascade of an ideal compensator and a corresponding actuator leading to a desired response according to an embodiment of the invention.

FIG. 2b illustrates a rearranged form of FIG. 2a.

FIG. 2c illustrates a proposed compensator design methodology according to an embodiment of the invention.

FIG. 3a is a schematic view of an embodiment of an atomic force microscope (AFM) according to an embodiment of the invention.

FIG. 3b is an illustration of the AFM set up with a close-up view of a multi-actuated scanner.

FIG. 4a is a cross-sectional view of the $Z_2$ flexure cap.

FIG. 4b is an illustration of a first vibrational mode of a short-range/high-speed out-of-plane actuator.

FIG. 4c is a cross-sectional view of the $Z_1$ flexure cap.

FIG. 4d illustrates a first out-of-plane vibrational mode for a large range/slower out-plane positioner.

FIG. 4e illustrates a first torsional mode of vibration of a large-range/slow speed out-of-plane diaphragm flexure.

FIG. 8a-f are large view AFM topography images of a calcite sample in deionized water.

FIG. 8g shows the time-lapse topography (top) and deflection (bottom) images after acid is injected into the environment.

DESCRIPTION OF THE PREFERRED EMBODIMENT

All the actuators disclosed herein are cascaded in series and unified into a single package, making it applicable in any AFM setup or other nano-positioning applications that simultaneously require high speed and large range capabilities. The control of the multi-actuated positioner of AFM is kept resilient to variations natural to atomic force microscopes (e.g. changes in sample stage, imaging mode, imaging environment, etc.). The designed scanner in a preferred embodiment has 120 μm lateral and 6 μm out-of-plane range and is capable of high-speed imaging, featuring a combination of functionalities disclosed herein. Furthermore, the scanner design ensures that the scan axes are all fully decoupled. The designed AFM in one embodiment features a large (15 mm diameter) waterproof sample stage with fully vertical approach mechanism, an optical head with 3.5 μm laser spot size and an image acquisition platform with 20 MHz data throughput capable of capturing high resolution images at video rate.

The advantage of utilizing multiple actuators in atomic force microscopy is rooted in the fact that, for both lateral and out-of-plane motion of the scanner, the travel range requirements are less stringent at higher frequencies. The out-of-plane motion is dictated by the spatial frequency content of the sample surface topography, which commonly contains low amplitude/high spatial frequency and large amplitude/low spatial frequency features. Similarly, the high frequency components of the raster command input to the lateral scan actuators are localized near the turnaround points which constitute a small portion of the scanning range. Decomposing a triangular raster scan command signal to its Fourier components shows that 81 percent of the scan range is accommodated by the first harmonic of the series, with all higher harmonics forming the remaining 19 percent. These observations imply that high-speed and large-range nano-positioning is possible if one combines slow and large-range actuators with those of wider mechanical bandwidth and shorter range.

Figure 1A:
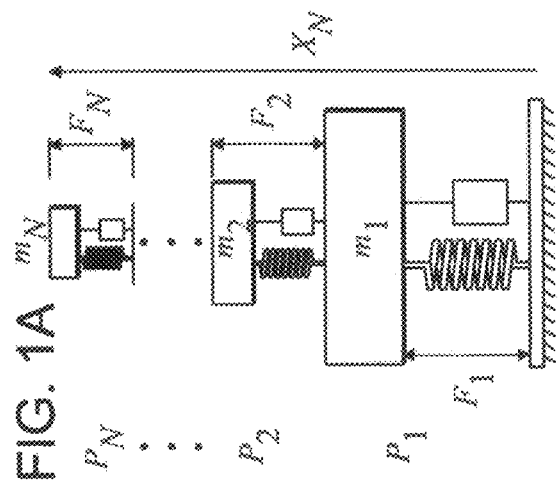
FIG. 1a is a schematic illustration of a cascaded arrangement of multiple actuators according to an embodiment of the invention.
Figure 1B:
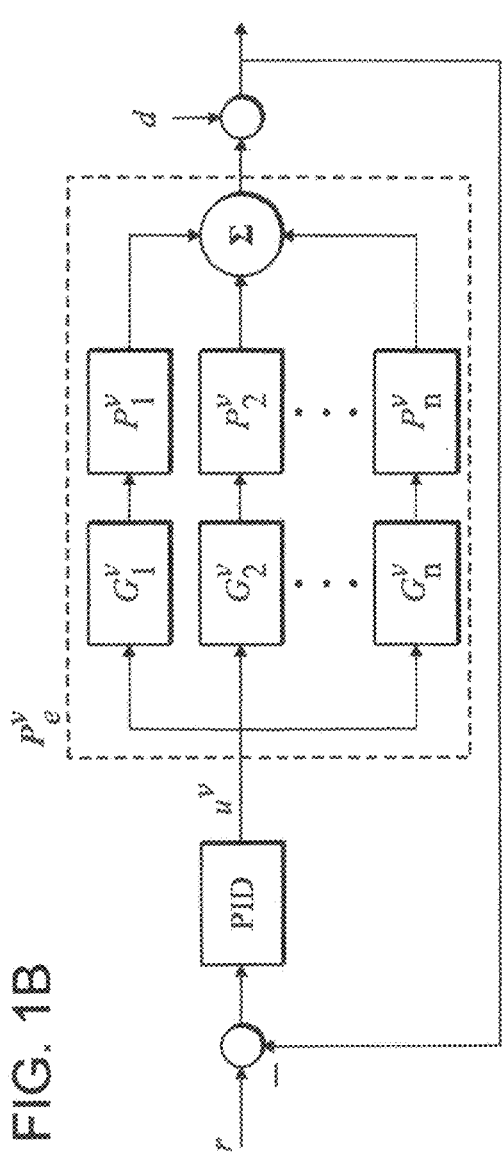
FIG. 1b is a schematic illustration of a disclosed control scheme according to an embodiment of the invention.
Figure 1C:
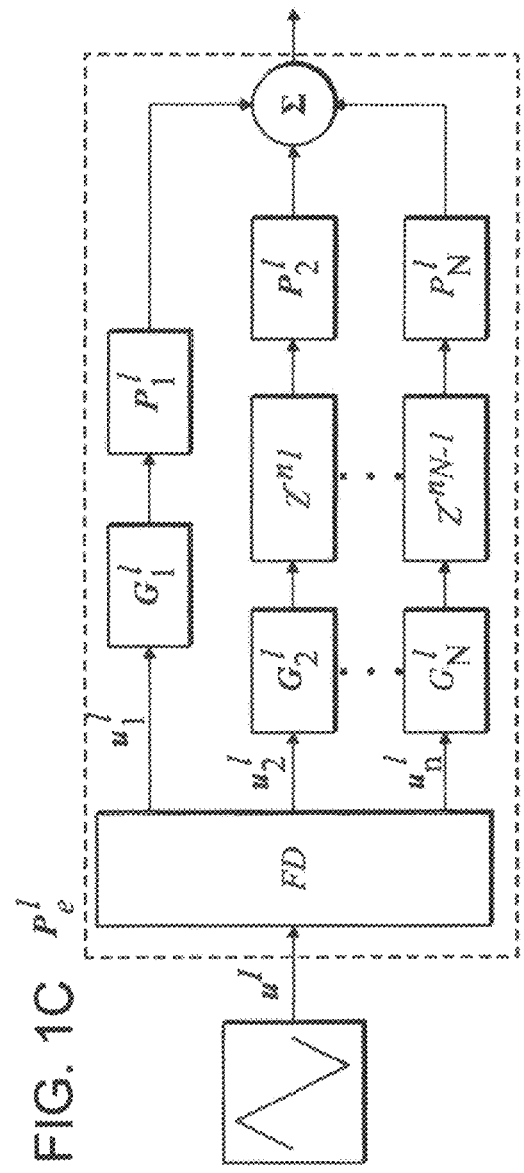
FIG. 1c is a schematic illustration showing a control system to control multiple lateral actuators.

In the simplest form of multi-actuation, several actuators are cascaded in series, sorted from the largest (slowest) to smallest (fastest). FIG. 1a schematically demonstrates this arrangement where each actuator is represented as a $2^{nd}$ order system with an incorporated actuation force. Although this arrangement of multiple actuators is practically appealing, it leads to dynamic coupling and thus necessitates dynamics compensation. The compensation can be done through a series of independent controllers. The control arrangement of FIG. 1b is proposed for out-of-plane topography tracking. In this form the system is robust to variations natural to AFMs. This is because the multi-actuation control for out-of-plane motion is designed auxiliary to a commonly used PID controller. The auxiliary control ensures that a multi-actuated scanner behaves similarly to a single high-speed and large-range actuator while a PID unit can be adapted to experiment specific needs. The control arrangement of FIG. 1c is proposed for lateral raster scan. In open loop form, a Fourier decomposition unit (denoted by FD) distributes various frequency components of the command signal to each actuator. This is elaborated upon below.

Each of the lateral (superscript l) or out-of-plane (superscript v) actuators, $P_1^{v/l}, P_2^{v/l}, \ldots, P_N^{v/l}$, (sorted from the slowest/largest-range, $P_{v/l}$, to fastest/shortest-range, $P_N^{v/l}$) that constitute the multi-component scanner are controlled by the assigned independent controllers $G_1^{v/l}, G_2^{v/l}, \ldots, G_N^{v/l}$. Upon implementation, the equivalent nano-positioners, $P_e^v$ and $P_e^l$, denoted by the dotted line in FIGS. 1b and 1c, exhibit a high positioning speed while maintaining a large scan range. The proposed approach for the design of the $G_n^{v/l}$ (n=1, . . . , N) units is described later. Every dataset, controller or design parameter vector can be associated with either the vertical or lateral actuators. Hence, the superscripts, v and l, are omitted. Vectors are denoted by bold, capital characters.

Let us consider a single actuator and the associated compensation unit (see FIG. 2). Assume that for a given input dataset to this system, $U_n=\{u_n(\min), m=1, \ldots, M\}$, the desired output, $D_n=\{d, (m), n=1, \ldots, M\}$, is known. One can commute the compensator and the actuator and then replace the actuator with its response, $R_n=\{r_n(m), n=1, \ldots, M\}$ to the given input. This significantly simplifies the design problem as the unknown parameters of the compensator, $G_n$, can now be obtained by minimizing the output error as shown in FIG. 2c. We can write:

$$\tilde{\Theta}_n = \arg\min E(\Theta_n) \quad (1)$$

where $\Theta_n = \{\Theta_{n1}, \ldots, \Theta_{n1}\}$ is a vector containing the unknown compensator parameters, and $$E(\Theta_n) = (D_n - Y(\Theta_n))(D_n - Y(\Theta_n))^T \quad (2)$$

$$= \sum_{m=1}^{M} [d_n(m) - y(m, \Theta_n)]^2$$

is the error energy with respect to a discrete set of desired response, $D_n$. In Eq. (2), $Y(\Theta_n) = \{y(m, \Theta_n), m=1, \ldots, M\}$, contains the samples associated with compensator response, i.e.

$$Y(\Theta_n) = H_n * R_n \quad (3)$$

where $H_n$ denotes the impulse response associated with $G_n(\Theta_n)$. The optimization problem of Eq. (1) is well studied, convex, and with a guaranteed solution for linear systems [35]. Furthermore, the stability of the resulting unit can be warranted per virtue of minimization of the error energy [35]. The proposed approach significantly simplifies the process as it removes a need for any intermediate modeling step and directly leads to a discrete domain compensator ready for hardware implementation. Due to the simplicity of the design approach, control parameters can be easily updated as needed. For the given approach to control design one needs access to the datasets $R_n$ and $D_n$. $R_n$ can be easily acquired by exciting the actuator, $P_n$, with $U_n(u_b^{v/l}$ in FIGS. 1$b$ and 1$c$), a wideband excitation signal such as random binary sequence. The desired response, $D_n$, of each actuator, should be formed separately. The step of forming the desired response for each actuator is discussed below.

Referring to FIG. 1$b$, let us assume that the operating frequency range to be assigned to each actuator is known a priori i.e. 0–$\omega_1^v$ for $P_1^v$, $\omega_1^v$–$\omega_2^v$ for $P_2^v$, and so on. The controllers $G_n^v$ (n=1 . . . N) can then be derived in a sequential manner. Starting from the first actuator (slowest and largest range), the desired response is a lowpassed version of the wideband excitation input, $U_1^v$=$U^v$, i.e.

$$D_1^v = K_1^v * U_1^v \quad (4)$$

where $K_1^v$ is the impulse response corresponding to a lowpass filter with a cutoff frequency of $\omega_1^v$. Upon the availability of $D_1^v$, $G_1^v$=$\tilde{G}_1^v$ can be obtained per Eqs. (1) to (3). Following the design of $G_1^v$, the desired response, $D_2^v$, of the second actuator, $P_2^v$, can be obtained. We know that the desired response of the first two actuators combined is a lowpassed version of the input, $U_2^v$=$U^v$. Hence, we can write:

$$D_2^v + \tilde{H}_1^v * R_1^v = K_2^v * U^v \Rightarrow D_2^v = K_2^v * U^v - \tilde{H}_1^v * R_1^v \quad (5)$$

where $\tilde{H}_1^v$ is the impulse response associated with the designed compensator $\tilde{G}_1^v$ and $K_2^v$ is the impulse response corresponding to a lowpass filter with a cutoff frequency of $\chi_2^v$. As before, upon the availability of $D_2^v$, $G_2^v$=$\tilde{G}_2^v$ can be obtained using Eqs. (1) to (3). Details about the selection of the order and cut-off frequency for stage lowpass filters can be found in [36]. This process is continued until all of the compensators are obtained.

For a raster scan pattern, the lateral scan command signal is known a priori as a triangular wave with known frequency and amplitude. The availability of this information makes the control design simpler. As shown in FIG. 1$c$, the Fourier components of the periodic triangular command wave for raster scanning can be independently assigned to each actuator, selected to match the associated available mechanical bandwidth. As a result, the role of frequency assignment can be removed from the compensators $G_n^l$ (n=1 . . . N), which are only needed to tackle the coupled dynamics. This approach removes the detrimental effect of large phase lags associated with the response of slower actuators and enables us to use their full mechanical bandwidth. The desired response of each lateral actuator can be written as:

$$D_n^l = K_n^l * U_n^l (n=1, \ldots, N) \quad (6)$$

where $K_n^l$ is the impulse response corresponding to a lowpass filter with a cutoff frequency of $\omega_n^l$, the natural mechanical cutoff frequency for actuator $P_n^l$. The order of this lowpass filter is selected such that its phase response matches that of the actuator. Given $D_n^l$, $G_n^l$=$\tilde{G}_n^l$ can be found using Eqs. (1) to (3).

It is also important that the command signal components that drive the lateral piezo actuators, result in their in-phase response. This ensures that the motions of the commanded actuators superimpose constructively to form a triangular pattern without phase distortion. Naturally faster actuators lead the slower ones in phase. One can introduce synthetic phase lag in the faster actuators so that their phase responses match that of the slowest actuator, $P_1^l$. This is done by incorporating digital delays on their command lines. The proper delay values, $q_n$ (n=2, . . . , N) are found by minimizing the error between the phase responses of $P_n^l$ and $P_1^l$:

$$\tilde{q}_n = \mathrm{argmin} F(q_n) \quad (7)$$

and $$F(q_n) = \sum_{i=1}^{I} [f_1(\omega_i) - f_n(\omega_i, q_n)]^2 \quad (8)$$

where $f_n(\omega_i, q_n)$ is the phase response for the $n^{th}$ compensated and $q_n$ sample delayed actuator at frequency $\omega_i$. The frequency range $\omega_i$ (i=1, . . . , I) covers the passband of $P_1^l$.

Schematics of an atomic force microscope designed based on the proposed multi-actuation methodology is shown in FIG. 3. The various components of this AFM are explained in the following.

A polarizing beam-splitter (420-680 nm), a dichroic short-pass mirror (600 nm) and a $\lambda$/4 plate (670 nm) form the laser path and provide an optical view to the sample/probe for site selection and laser adjustment. A separate beam splitter coaxially illuminates the sample. The laser diode (670 nm, 5 mW) is aligned with a collimation tube to form a 2.4 mm diameter laser beam. The laser driver is RF-modulated to reduce laser optical feedback noise as discussed in [13]. An L Plan 20X SLWD Nikon objective lens focuses the laser to a 3.5 μm spot size suitable for small cantilevers.

A schematic illustration of the multi-actuated scanner is shown in FIG. 3$a$. A close-up view of the scanner is shown in FIG. 3$b$. The scanner is composed of five independent positioners, 2 for out-of-plane Z motion, 2 for lateral X motion, and 1 for lateral Y positioning. For both of the out-of-plane nano-positioners, a piezo-stack actuator is pre-loaded in between a pressure screw and a flexure diaphragm (see the scanner schematic of FIG. 3$a$.) In addition to pre-loading, the flexure cap also protects the high voltage electrical connections of the piezos when operating in liquid. The out-of-plane motion is achieved as the piezo-stack expands and deforms the aluminum diaphragm flexure. The range and bandwidth specifications for each out-of-plane positioner is affected by the diameter and thickness of the flexure diaphragm. The $Z_2$ positioner is designed to achieve a wide mechanical bandwidth at a relatively short range (~1 μm). The outer diameter of the cap and the flexure diaphragm are 15.2 mm and 11.9 mm, respectively. In this embodiment a piezo stack actuator (2 mm×2 mm×2 mm, Physik Instrumente, PL022.30) is glued on both ends i.e. to the 0.5 mm thick diaphragm as well as the pressure screw using instant adhesive (Loctite 401) to maximize the out-of-plane bandwidth.

A section view of the $Z_2$ flexure cap is demonstrated in FIG. 4$a$. The first vibration mode of the $Z_2$ diaphragm is shown in FIG. 4$b$, associated with a 112 kHz resonance. The weight of the $Z_2$ cap is approximately 2 grams. This cap is carried by a short-range (10 μm) and high-speed shear piezo (10 mm by 10 mm by 12 mm shear piezo stack, Physik Instrumente, P-141.10) for fast lateral actuation, hereafter referred to as $X_2$. The $X_2$, $Z_2$ assembly is accommodated by a large-range (6 μm) and slow out-of-plane flexure diaphragm referred to as $Z_1$. The large-range out-of-plane flexure cap, $Z_1$, is driven by a 5 mm by 5 mm by 9 mm piezo stack (Physik Instrumente, P-885.11) and features a large aspect ratio (diameter, 42 mm, height, 10.25 mm) to minimize the effect of lateral structural dynamics. The thickness of the diaphragm and its diameter are 0.6 mm and 19.1 mm, respectively. The $Z_1$ piezo stack actuator is permanently fixed only on one end to the flexure diaphragm using Loctite 401 to enable disassembly of the scanner. FIG. 4$c$ shows a section view of the $Z_1$ flexure cap. FIG. 4$d$ demonstrates the first out-of-plane vibration mode-shape of $Z_1$ diaphragm at 6.7 kHz. The torsional vibration mode-shape of the $Z_1$ diaphragm, at 5.6 kHz, is shown in FIG. 4e. This mode of vibration is of importance to the lateral positioning capability of the scanner and limits the lateral scan bandwidth of the shear piezo. The $Z_2$-$X_2$-$Z_1$ assembly is mounted on a large-range (120 μm) X positioner (hereafter referred to $X_1$) aligned with $X_2$ and mounted on a slow and large-range (120 μm) Y positioner (Physik Instrumente, P-611.20). To reduce the effect of out-of-plane dynamics of the stacked $X_1$-Y positioner, the setup is passively damped by filling the gap between the $X_1$ and Y flexures with polyurethane film (Sorbothane) with a durometer hardness of 60 OO and thickness of 1.5 mm. The cascaded arrangement of the lateral positioners ensures a fully decoupled response. The slowest actuator Y is aligned with the slowest lateral scan direction and performs the frame up/down positioning. The $X_1$ and $X_2$ actuators work together to move the sample along the fast raster scan axis. Similarly the $Z_1$ and $Z_2$ cooperate to achieve a large-range and high-speed out-of-plane performance.

Two independent FPGA platforms are used to drive the lateral and out-of-plane actuators. The out-of-plane actuators are driven by a National Instruments (NI) PXIe-7966R FlexRIO module with an NI 5781 baseband transceiver. The PID control is implemented at 25 MHz clock rate. Two compensators $\tilde{G}_1^v$ and $\tilde{G}_2^v$ implemented on the same FPGA platform cascade the PID unit and drive the out-of-plane positioners, dividing the tracking responsibilities and compensating for their coupled dynamics. The three lateral actuators are driven by an NI PXI-7851 FPGA module. The AFM approach mechanism is also implemented on this FGPA. Fourier decomposition and shaping of the raster scan command signals via $\tilde{G}_1^l$ and $\tilde{G}_2^l$ are done on a host NI PXIe-8135 with 2.3 GHz core Windows controller. Data acquisition and image formation is implemented on the same controller with 20 MHz data throughput for capturing and plotting images. The piezo drive amplifiers are custom-made to meet the bandwidth requirements of high-speed atomic force microscopy for lateral and out-of-plane piezos, reaching 1 MHz for the fastest positioner.

The dynamic performance of various scanner components are measured using a custom-made dynamic signal analyzer implemented in LabVIEW and using an NI USB-6251 DAQ device. The analyzer excites the scanner with a random binary sequence and measures the response. The empirical transfer function estimate of each actuator is then formed in MATLAB. The network analyzer can also generate raster scan patterns with incorporated Fourier decomposition, signal shaping, and delay according to FIG. 1c, in order to evaluate the combined performance of the lateral positioners.

Figure 5A:
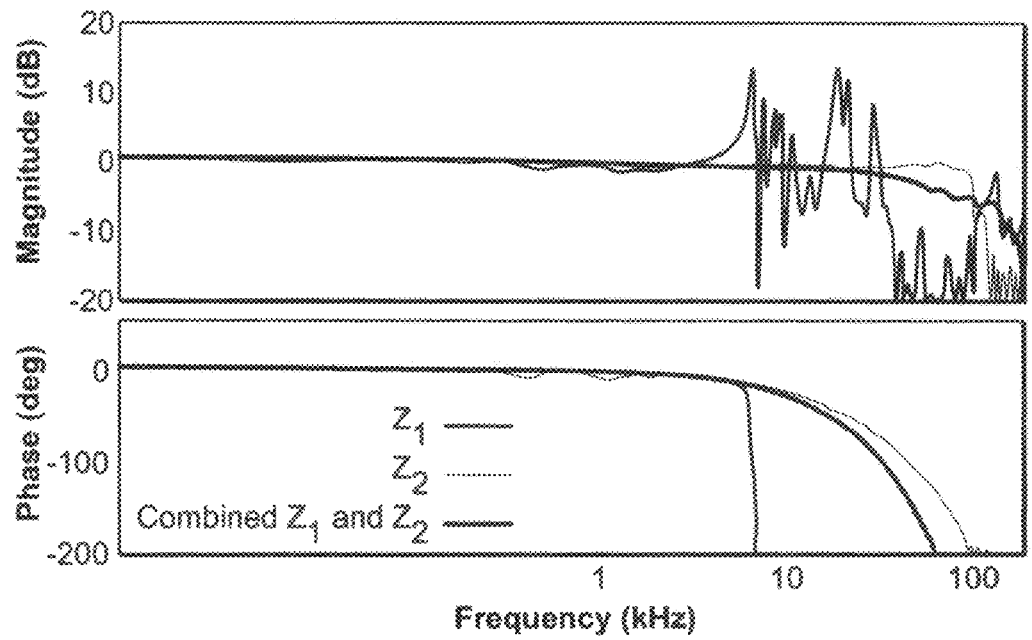
FIG. 5a are graphs illustrating frequency responses of the isolated and combined out-of-plane actuators according to an embodiment of the invention.
Figure 5B:
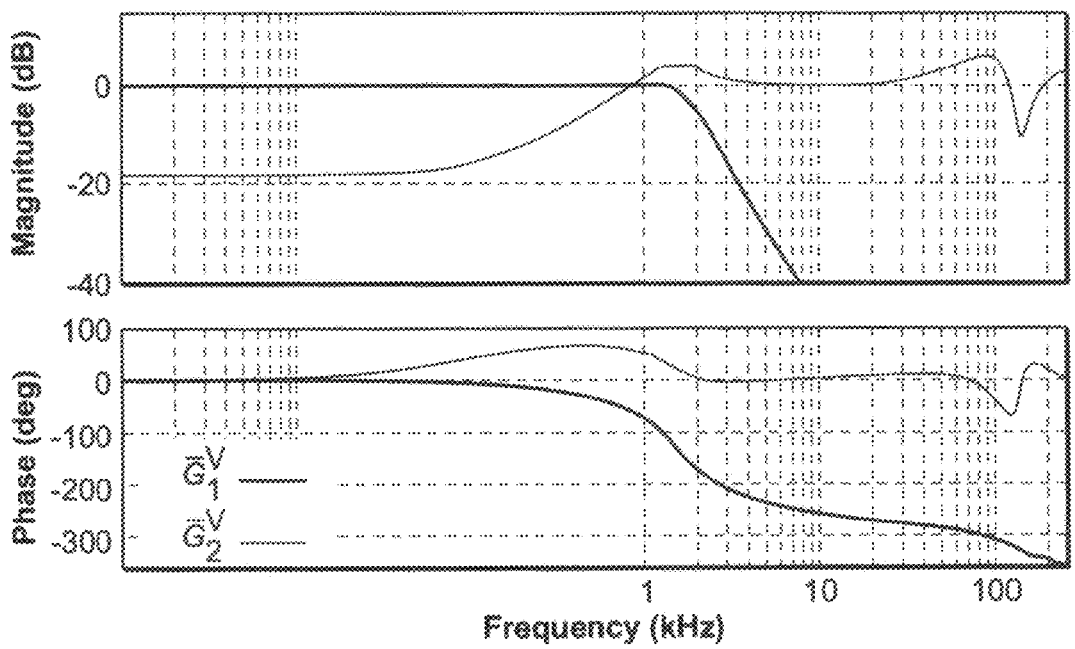
FIG. 5b are graphs showing frequency response of the designed compensators for out-of-plane actuators according to an embodiment of the invention.

To measure the frequency responses associated with $Z_1$ and $Z_2$, an AFM probe with fast dynamics is brought in contact with the sample. While the probe and sample are engaged, each of the $Z_1$ and $Z_2$ actuators is excited by a wideband random binary sequence signal and the cantilever deflection is simultaneously acquired. FIG. 5a demonstrates the open-loop frequency response of the slow/large range out-of-plane actuator, $Z_1$, in black. This actuator has a strong resonance near 7 kHz. The frequency response of the fast/short-range actuator, $Z_2$, is demonstrated on the same figure in red. FIG. 5b demonstrates the frequency response of the compensators $G_1^v$ and $G_2^v$ designed based on the methodology presented above. $\tilde{G}_1^v$ (4th order) demonstrates a lowpass behavior, assigning 0-1.5 kHz to $Z_1$. This frequency range handles tracking of the sample tilt and low spatial frequency surface features with 6 μm effective range. $\tilde{G}_2^v$ (10th order) shows a high-pass behavior complementary to $\tilde{G}_1^v$ assign higher frequency tracking to the faster out-of-plane positioner. This compensator also tackles the higher frequency dynamics of the flexure cap to achieve a maximally at frequency response over the passband 0-100 kHz. The frequency response of the combined $Z_1$-$Z_2$ system is superimposed on FIG. 5a.

Figure 6A:
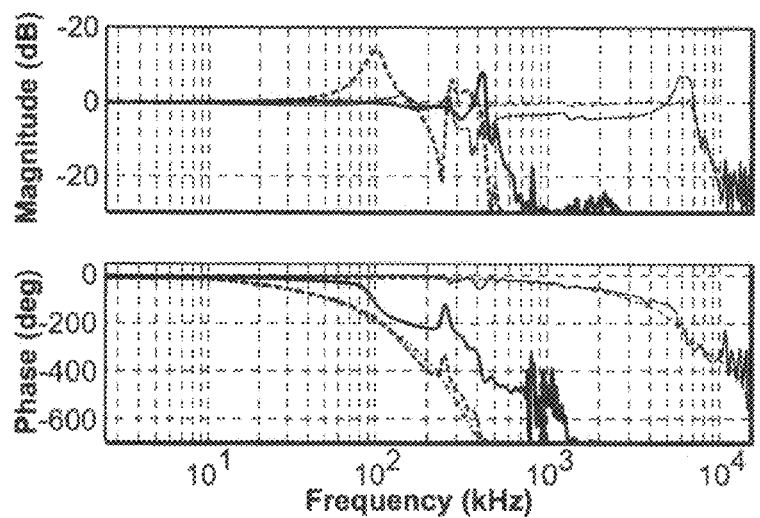
FIG. 6a are graphs showing frequency responses of uncompensated $X_1$, uncompensated $X_2$, compensated $X_1$ and compensated $X_2$ positioners.
Figure 6B:
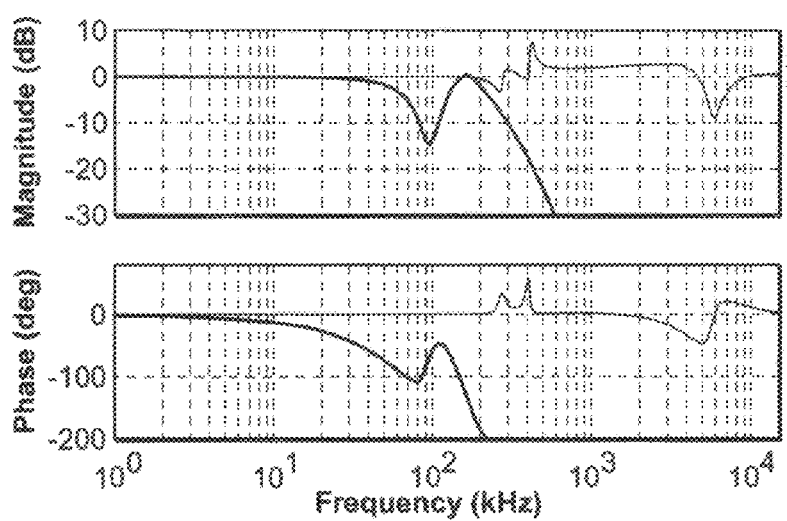
FIG. 6b are graphs showing frequency response of designed compensators for lateral positioners according to an embodiment of the invention.
Figure 6C:
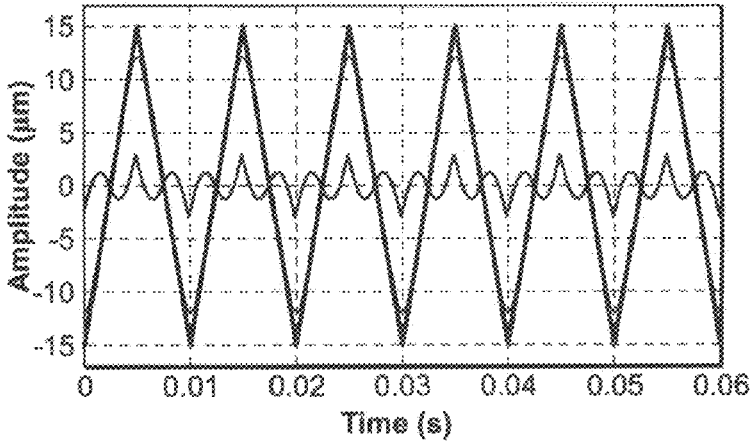
FIG. 6c shows combined and isolated displacement response of the lateral multi-component scanner to a 100 Hz, 30 μm triangular command signal.

A laser interferometer (SIOS SP-S 120) is used to measure the dynamic response of the lateral actuators. FIG. 6a shows the frequency responses for the uncompensated $X_1$ and $X_2$ lateral positioners in black and red, respectively. The compensators $\tilde{G}_1^l$ (6th order) and $\tilde{G}_2^l$ (8th order) are implemented at 5 kHz and 50 kHz, respectively. The shaped command signals are up-sampled to 800 kHz to maximize the lateral resolution performance of the AFM at high speeds. The frequency responses of the designed compensators, $\tilde{G}_1^l$ and $\tilde{G}_2^l$, are given in FIG. 6b in black and red, respectively. The compensated frequency responses are superimposed on the plots of FIG. 6a in green and blue for $X_1$ and $X_2$, respectively. The phase response of the compensated $X_2$ leads the phase response of the compensated $X_1$ significantly. $X_2$ is artificially delayed to avoid phase distortion in the combined response of the two actuators. Here an optimal delay of samples at 50 kHz compensation frequency is incorporated on the $X_2$ command line. FIG. 6a also demonstrates the phase response of the delayed and compensated $X_2$ actuator (dashed brown line). With the incorporation of the delay, the phase responses of the two actuators X, and $X_2$ match well over the pass-band of $X_1$ (0-150 Hz). FIG. 6c shows the combined response of the two actuators at 100 Hz scan rate and for a 30 μm scan range in blue. At this frequency the $X_1$ component of the scanner can only respond to the first harmonic of the scan command. However, the triangular pattern is preserved in the response of the multi-actuated setup. The higher harmonics of the raster scan pattern are fed to the short-range/high-speed shear piezo ($X_2$). The isolated response of the individual actuators $X_1$ and $X_2$ measured with the laser interferometer are superimposed on the same plot in black and red, respectively. As expected, the isolated response of the slow and large-range actuator is smoothed significantly on turn-arounds. It is noted that a major portion of the 30 μm scan range is covered by this actuator. $X_2$ provides the sharp turn-arounds with approximately 6 μm travel range to complement the large-range positioning of $X_1$.

Figures 7A, 7B:
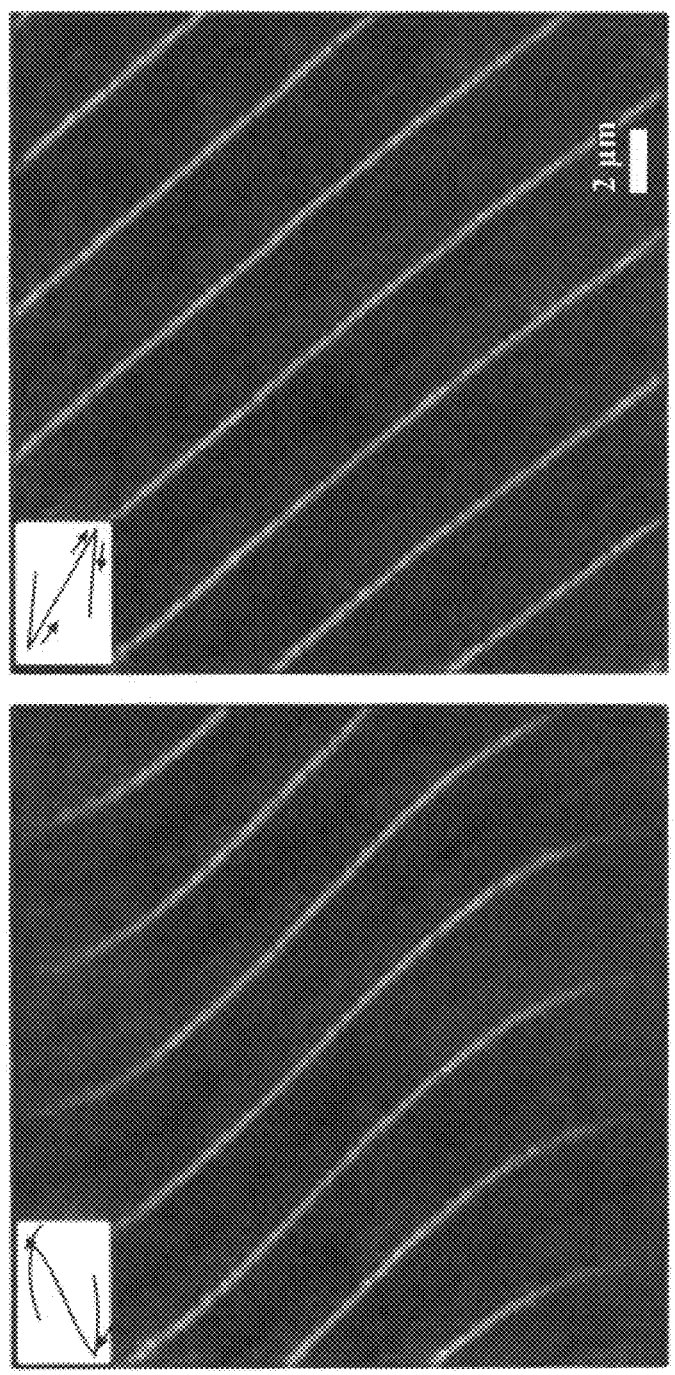
FIG. 7a is a deflection AFM image of a calibration grating at 50 Hz scan rate when the high-speed, short-range actuator is disabled.
FIG. 7b is a deflection AFM image of a calibration grating at 50 Hz scan rate when the high-speed, short-range actuator is enabled.

The straight line features of a standard calibration grating make a good platform to demonstrate the improvements brought about through the disclosed lateral multi-actuation methodology. FIG. 7a shows the deflection AFM image acquired from a square, 3 μm pitch, calibration grating at 50 Hz scan rate when the fast lateral shear actuator ($X_2$) is disabled. The acquired images are significantly distorted towards the end of each scan line as a result of smoothing near the turnaround points. It is also noted that the deflection error is maximum near the center of the image and is reduced towards the top and bottom edges. These unwanted phenomena are caused by the loss of higher harmonics of the raster scan command. More importantly, calibration accuracy is lost as the actual scan range ($\cong 0.81 \times 18 = 14.5$ μm) is smaller than the commanded 18 μm. FIG. 7b demonstrates the imaging performance of the AFM after activation of the fast lateral positioner which is responsible for the higher harmonics of the raster scan pattern. The parallel features of the image are preserved and the deflection error is consistently distributed on the deflection image. The slight deviation from the straight line observed in this image is attributed to the hysteresis of the two lateral positioners.

We visualize the etching process of a freshly cleaved {10T4} calcite sample surface in a diluted solution of sulfuric acid in contact mode. A small cantilever (SCL-SensorTech) with fast dynamics and small spring constant (0.5 N/nm) is used. The imaging starts on the calcite sample in deionized water over a large scan area (70 μm×70 μm) at 10 Hz scan rate (FIG. 8(a)). The calcite exposed to DI water shows wide, at terraces with step heights of a few nanometers. It also shows several shallow (~1 nm) and deeper (~10 mm) etch pits, which are formed characteristically on calcite surface exposed to DI water [37]. The scan size is gradually decreased to 3.1 μm while the scan speed is increased to keep the tip speed constant at ~3.2 mm/s (37 Hz, 50 Hz, 75 Hz, 150 Hz, 251 Hz and 512 Hz for FIG. 8 parts (b) to (g) respectively). The final 3.1 μm×3.1 μm sample site is selected to reflect a moderate population of deep pits for the real-time observation of etching process in acid. Following the injection of 0.05 M $H_2SO_4$ (pH≈1.3), the surface morphology changes rapidly, showing layer-by-layer dissolution of terraces, formed through the merger of two or more pits or a pit and another step. The average height of the calcite terraces is measured as 16±5 nm. The etching process is observed to be most active on the top calcite layer leading to a retreat velocity of ~254 nm/s. The time-lapse of FIG. 8(g) shows the full dissolution of a deep step terrace during a 4-second time interval. The semi-rhombic shapes of the retreating steps reflect the rhombohedral symmetry of calcite crystals and maintain approximately a straight morphology along the moving steps during the dissolution. On top of each terrace, there are smaller steps with relatively small height (~3 nm) which are barely affected by the acid. Analysis of the time-lapse AFM images can also provide a relatively accurate estimate of calcite dissolution rate. AFM has been used in the past [38] to quantify the calcite dissolution process in pH>3.7 with an average step retreat velocity of a few nanometers per second. However, these experiments have not been extended to lower pH solutions where the step retreat velocities exceed 10 nm/s due to the slow operation speed of conventional AFMs. The following equation is used to estimate the calcite dissolution rate R (mol $cm^{-2}s^{-1}$) from an analysis of the time-lapse AFM images:

$$R = \frac{nD}{V_m T}$$

where n is the number of calcite layers dissolved over the experiment interval T, D is the average thickness of the dissolving layers, and Vm is the molar volume of calcite (36.93 $cm^3$ $mol^{-1}$). The dissolution rate obtained based on the above equation is 9.98×10$^{-9}$ mol $cm^2s^{-1}$. The dissolution rate of calcite in HCl (pH of 1.7) has been measured through chemical analysis by Guidici [39] and is reported as 4×10$^9$ mol $cm^{-2}s^{-1}$ which is in fair agreement with our calculation.

The high speed imaging capability of the presented AFM is utilized for the study of calcite dissolution kinetics at low pH levels. The large range of the instrument helped us to assemble a more detailed perspective about the state and morphology of the sample over a significantly wider view prior to acid injection. This feature also enabled us to select the sample site of interest for real-time analysis. Other aspects of the device such as large sample stage and optical view to the sample contributed to the ease of use and flexibility of the instrument.

A multi-actuation methodology for large-range and high-speed atomic force microscopy has been presented. In the disclosed approach, various nanopositioners with different range and bandwidth specifications are combined in a cascaded series form. The dynamic couplings between the different actuators are treated through control. An intuitive data-based control design methodology was disclosed where the controllers are derived directly without intermediate modeling. A multi-actuated atomic force microscope was designed and implemented based on the proposed methodology. Two flexure-based out-of-plane positioners work together to achieve 6 μm range and 100 kHz bandwidth. A large-range (120 μm) lateral positioner is combined with a high-speed (7 kHz) and short-range (10 μm) shear piezo stack to simultaneously meet the large scan range and high-speed imaging requirements. Etching of calcite crystals in diluted sulfuric acid is visualized using this AFM. The fast (~254 nm/s) retreat of individual crystal layers with an average thickness of 16 nm is captured. The morphology of dissolving layers is observed to be affected by the crystalline structure of calcite even at low pH levels. Furthermore, through the analysis of the time-lapse images the dissolution rate of calcite is found to be 9.98×10$^{-9}$ mol $cm^2s^{-1}$. The AFM presented here combines high-speed imaging 300 capability with lateral/out-of-plane scan range larger than any previously reported in an instrument of this type. Various practical features, such as simultaneous optical view of the sample and probe, a conveniently large sample stage, and compatibility with small cantilevers, further enhance its utility as a research tool. This design enables studies of various dynamic nanoscale processes in air and in aqueous environments.

It is recognized that modifications and variations of the present invention will be apparent to those of ordinary skill in the art and it is intended that all such modifications and variations be included within the scope of the appended claims.

The contents of all of the references listed herein are incorporated herein by reference.

REFERENCES

[1] A. Vicary, M. J. Miles, Real-time nanofabrication with high-speed atomic force microscopy, Nanotechnology 20 (9) (2009) 095302.

[2] L. M. Picco, P. G. Dunton, A. Ulcinas, D. J. Engledew, O. Hoshi, T. Ushiki, M. J. Miles, High-speed afm of human chromosomes in liquid, Nanotechnology 19 (38) (2008) 384018.

[3] C. Braunsmann, J. Seifert, J. Rheinlaender, T. E. Schffer, High-speed force mapping on living cells with a small cantilever atomic force microscope, Review of Scientific Instruments 85 (7) (2014).

[4] T. Ando. High-speed atomic force microscopy coming of age, Nanotechnology 23 (6) (2012) 062001.

[5] Y. K. Yong, S. O. R. Moheimani, I. R. Petersen, High-speed cycloid-scan atomic force microscopy, Nanotechnology 21 (36) (2010) 365503.

[6] L. M. Picco, L. Bozec, A. Ulcinas, D. J. Engledew, M. Antognozzi, M. A. Horton. M. J. Miles, Breaking the speed limit with atomic force microscopy, Nanotechnology 18 (4) (2007) 044030.

[7] D. M. Carberry. L. Picco, P. G. Dunton, M. J. Miles, Mapping real-time images of high-speed afm using multi-touch control, Nanotechnology 20 (43) (2009) 434018.

[8] S. Tien, K. K. Leang, Q. Zou, S. Devasia, A review of feedforward control approaches in nanopositioning for high-speed spm, Journal of Dynamic Systems, Measurement, and Control 131 (6) (2009) 061101.

[9] Y. Wu, J. Shi, C. Su, Q. Zou, A control approach to cross-coupling compensation of piezotube scanners in tapping-mode atomic force microscope imaging, Review of Scientific Instruments 80 (4) (2009)

[10] C. Braunsmann, V. Prucker. T. E. Schffer, Optical knife-edge displacement sensor for high-speed atomic force microscopy, Applied Physics Letters 104 (10) (2014).

[11] D. Yamamoto. T. Uchihashi, N. Kodera, T. Ando, Anisotropic diffusion of point defects in a two 330 dimensional crystal of streptavidin observed by high-speed atomic force microscopy, Nanotechnology 19 (38) (2008) 384009.

[12] A. J. Fleming, A megahertz bandwidth dual amplifier for driving piezoelectric actuators and other highly capacitive loads, Review of Scientific Instruments 80 (10) (2009) 104701.

[13] T. Fukuma, M. Kimura, K. Kobayashi, K. Matsushige, H. Yamada. Development of low noise cantilever deection sensor for multienvironment frequency-modulation atomic force microscopy, Review of Scientific Instruments 76 (5).

[14] Y. K. Yong, S. O. R. Moheimani, B. J. Kenton, K. K. Leang, Invited review article: High-speed exureguided nanopositioning: Mechanical design and control issues, Review of Scientific Instruments 83 (12).

[15] G. Schitter, K. J. Astrom, B. E. DeMartini, P. J. Thurner, K. L. Turner, P. K. Hansma, Design and modeling of a high-speed afm-scanner, Control Systems Technology, IEEE Transactions on 15 (5) (2007) 906-915, iD: 1.

[16] I. S. Bozchalooi, K. Youcef-Toumi, D. J. Burns, G. E. Fantner, Compensator design for improved counterbalancing in high speed atomic force microscopy, Review of Scientific Instruments 82 (11) (2011) 113712, pT: J; UT: WOS:000297941100032.

[17] A. J. Fleming, Dual-stage vertical feedback for high-speed scanning probe microscopy, IEEE Transactions on Control Systems Technology 19 (1) (2011) 156-165.

[18] Y. Wu, Q. Zou, Robust inversion-based 2-dof control design for output tracking: Piezoelectric-actuator example, Control Systems Technology, IEEE Transactions on 17 (5) 525 (2009) 1069-1082.

[19] K. Leang, Q. Zou, S. Devasia, Feedforward control of piezoactuators in atomic force microscope systems, Control Systems, IEEE 29 (1) (2009) 70-82.

[20] E. S. C. Braunsmann, T. E. Sch_er, High-speed atomic force microscopy for large scan sizes using small cantilevers, Nanotechnology 21 (22) (2010) 225705.

[21] G. Schitter, A. F Allgwer and. A new control strategy for high-speed atomic force microscopy, Nanotechnology 15 (1) (2004) 108.

[22] T. Ando, N. Kodera, Y. Naito, T. Kinoshita, K. Furuta, Y. Toyoshima, A high-speed atomic force microscope for studying biological macromolecules in action, Chemphyschem 4 (11) (2003) 1196-1202.

[23] T. E. Sch a_er, P. K. Hansma, Characterization and optimization of the detection sensitivity of an atomic force microscope for small cantilevers, Journal of Applied Physics 84 (9) (1998) 4661-4666.

[24] K. E. AIFANTIS, S. SHRIVASTAVA, S. H. PELIDOU, Capturing the elasticity and morphology of live fibroblast cell cultures during degradation with atomic force microscopy, Journal of microscopy 249 (1) (2013) 62-68.

[25] G. Schitter, W. F. Rijkee, N. Phan, Dual actuation for high-bandwidth nanopositioning, 2008 47th Ieee Conference on Decision and Control: (Cdc), Vols 1-9 (2008) 1782-1787.

[26] A. J. Fleming, High-speed vertical positioning for contact-mode atomic force microscopy, 2009 Ieee/asme International Conference on Advanced Intelligent Mechatronics, Vols 1-3 (2009) 522-527.

[27] S. Kuiper, A. J. Fleming, G. Schitter, Dual actuation for high speed atomic force microscopy, 5th IFAC Symposium on Mechatronic Systems (2010) 220.

[28] T. Sulchek, S. C. Minne, J. D. Adams, D. A. Fletcher, A. Atalar. C. F. Quate, D. M. Adderton, Dual integrated actuators for extended range high speed atomic force microscopy, Applied Physics Letters 75 (11) (1999) 1637-1639.

[29] Y. Jeong, G. R. Jayanth, C.-H. Menq, Control of tip-to-sample distance in atomic force microscopy: A dual-actuator tip-motion control scheme, Review of Scientific Instruments 78 (9) (2007) 093706.

[30] H. MAMIN, H. BIRK, P. WIMMER, D. RUGAR. High-speed scanning-tunneling-microscopy—principles and applications, Journal of Applied Physics 75 (1) (1994) 161-168.

[31] A. J. Fleming, B. J. Kenton, K. K. Leang, Ultra-fast dual-stage vertical positioning for high performance spms, 2010 American Control Conference (2010) 4975-4980.

[32] Y. Yan, Y. Wu, Q. Zou, C. Su, An integrated approach to piezoactuator positioning in high-speed atomic force microscope imaging, Review of Scientific Instruments 79 (7) (2008) 073704.

[33] S. Kuiper, G. Schitter, Model-based feedback controller design for dual actuated atomic force microscopy, Mechatronics 22 (3) (2012) 327-337.

[34] K. Akagi, H. Otsuki, T. Yamaguchi, K. Mori, Servo signal quality and dual-stage actuator system for micron trackwidth, Journal of Magnetism and Magnetic Materials 134 (23) (1994) 242-247.

[35] L. Ljung, System Identification: Theory for the user, 2nd Edition, Prentice Hall, UpperSaddle River, N.J., 1999.

[36] I. S. Bozchalooi, K. Youcef-Toumi, Multi-actuation and fPIg control: A simple recipe for high-speed and large-range atomic force microscopy, Ultramicroscopy 146 (0) (2014) 117-124.

[37] Anisotropic dissolution at the caco3water interface, Surface Science.

[38] R. Shiraki, P. Rock, W. Casey, Dissolution kinetics of calcite in 0.1 m nacl solution at room temperature: An atomic force microscopic (afm) study, Aquatic Geochemistry 6 (1) (2000) 87-108.

[39] G. De Giudici, Surface control vs. diffusion control during calcite dissolution: Dependence of step-edge velocity upon solution ph, American Mineralogist 87 (10) (2002) 1279-1285.

What is claimed is:

1. Multi-actuator system for nanopositioning control comprising:
    at least two nanopositioners having different ranges and bandwidths located in cascaded series form to contact and move an object; and
    a control system to combine the at least two nanopositioners so as to apportion actuation responsibilities among the at least two nanopositioners and to compensate for their coupled dynamics while moving the object, the system including a separate controller for controlling separately each of the at least two nanopositioners and wherein parameters of the separate controllers are determined by minimizing output error.

2. The system of claim 1 wherein the controller system employs a data-based control design scheme.

3. The system of claim 1 wherein the at least two nano positioners each contain a piezoelectric stack.

4. The system of claim 1 wherein the at least two nano positioners position the object in an atomic force microscope scanner.

5. The system of claim 1 wherein the control system comprises a PID unit cascaded by a single-input multi-output auxiliary control system including several subcomponents $G_n^{v/l}$ (n=1, ..., N).

6. The system of claim 1 wherein a) apportioning of the actuation responsibility and b) compensation of the dynamic coupling for every single actuator component are implemented either through a single auxiliary control unit or multiple cascaded units.

7. The system of claim 1 wherein part or all of the components of the control system are designed to cooperatively achieve a flat passband for a multi-actuator positioner.

8. The system of claim 7 wherein all or part of the subcomponent control units $G_n^{v/l}$ (n=1, ..., N) are obtained through a model fitting and model inversion in order to effectuate a compensation for the dynamics.

9. The system of claim 7 wherein each of the subcomponent control units $G_n^{v/l}$ (n=1, ..., N) are obtained by combining/cascading, several subunits including frequency assignment filters and dynamic-compensation filters.

10. The system of claim 1 wherein all or some of the subcomponent control units implement a) a frequency division of positioning responsibility and/or b) compensate for the inherent structural dynamics or those dynamics due to a coupling between cascaded actuators.

11. The system of claim 10 wherein the subcomponent control units $G_n^{v/l}$ (n=1, ..., N) implement fully or partially an inverse dynamics of the multi-actuator nano positioner.

12. The system of claim 1 wherein the multi-actuator nano-positioner positions an object in the lateral (horizontal) direction a) to scan a sample in an atomic force microscope to directly obtain large-view AFM images or to enable combining several smaller captured images in order to form larger views, or h) to change the imaging site from one sample site to another across larger ranges.

13. The system of claim 1 wherein the multi-actuator nano-positioner positions an object in the vertical (out-of-plane) direction to follow the sample surface topography in an atomic force microscope across larger ranges.

* * * * *